Figure 5:
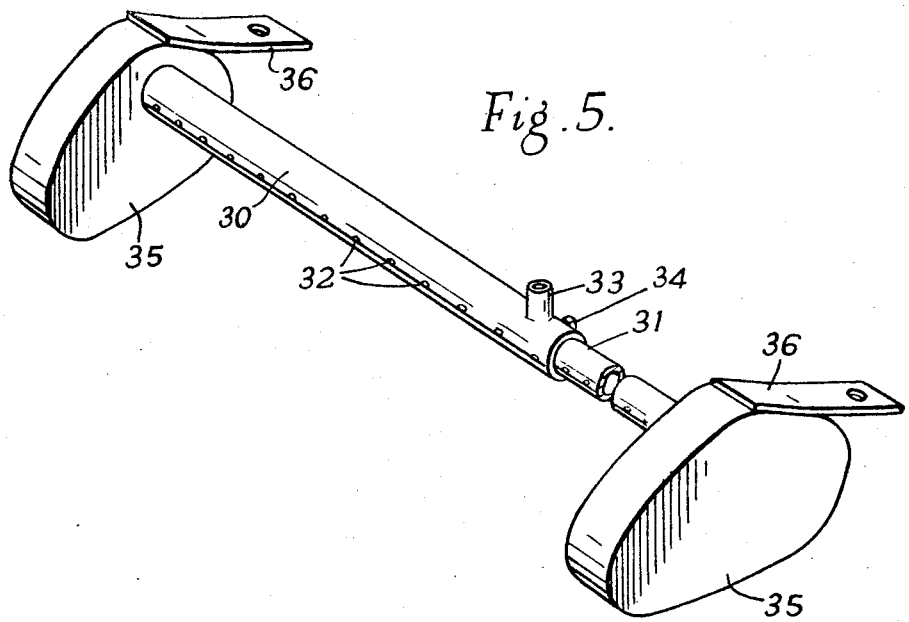

Sept. 6, 1966
R. WATTS
3,270,962
APPLICATOR
Filed Nov. 29, 1962
4 Sheets-Sheet 1
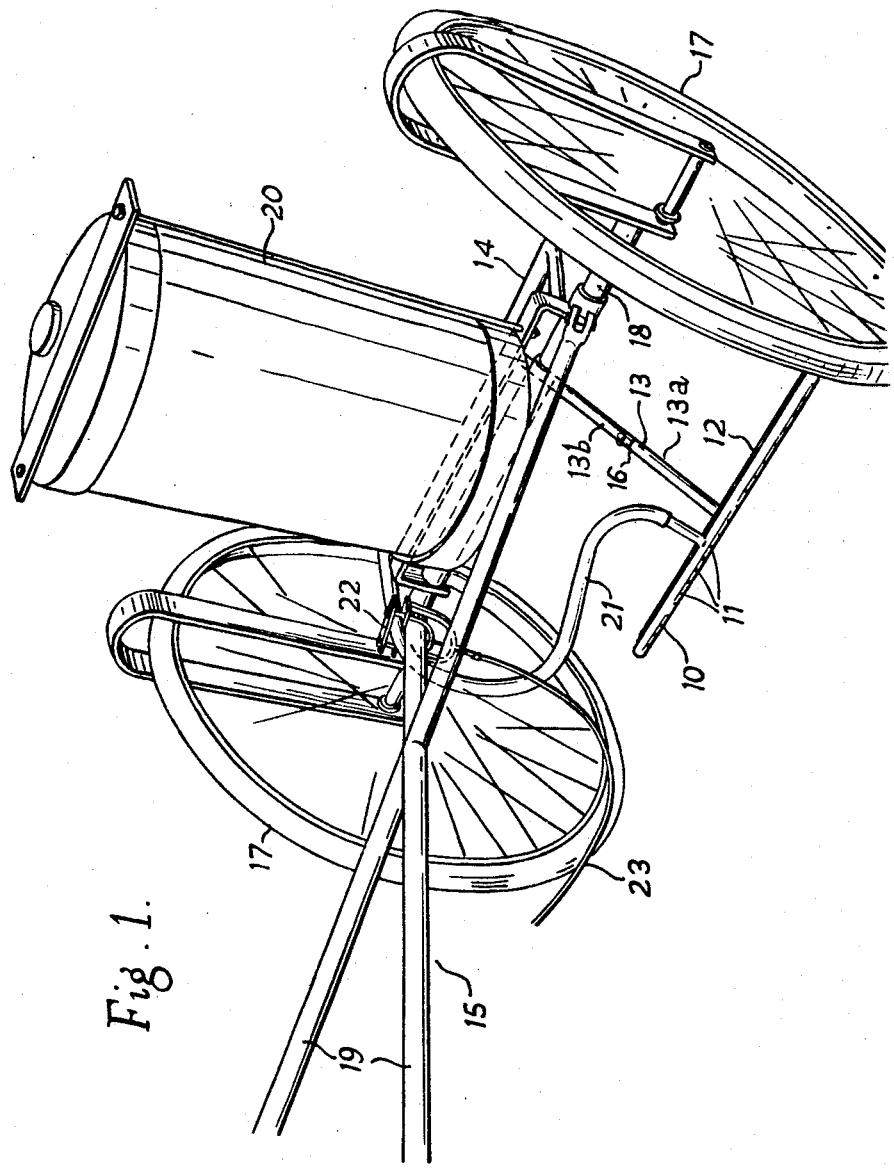
INVENTOR
ROBERT WATTS
BY
Cushman, Darby & Cushman
ATTORNEYS

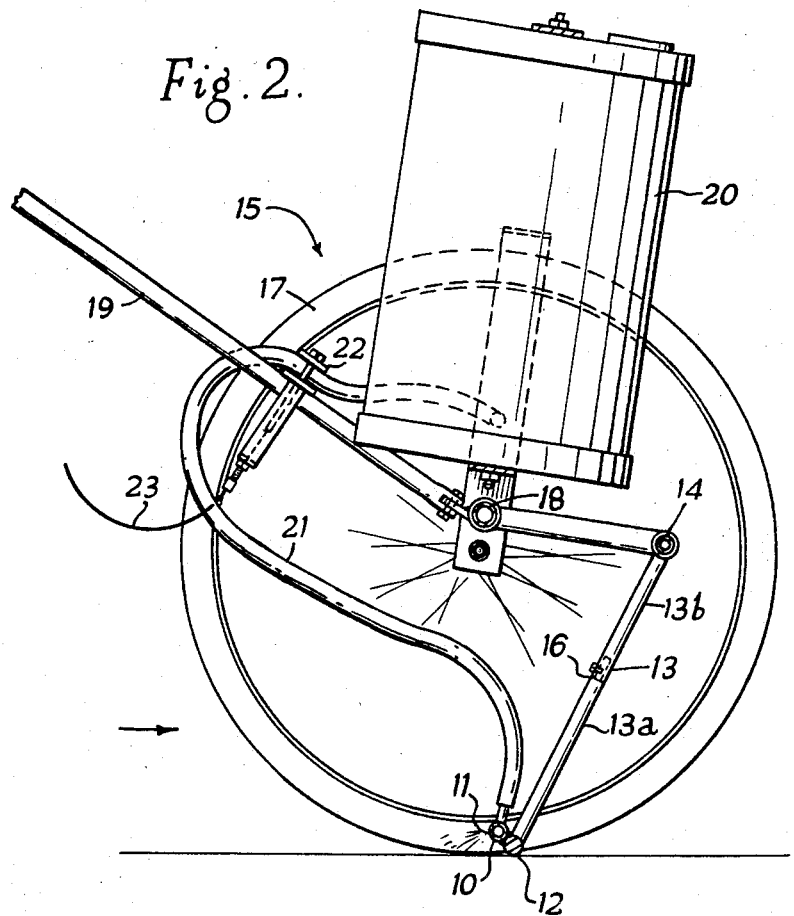

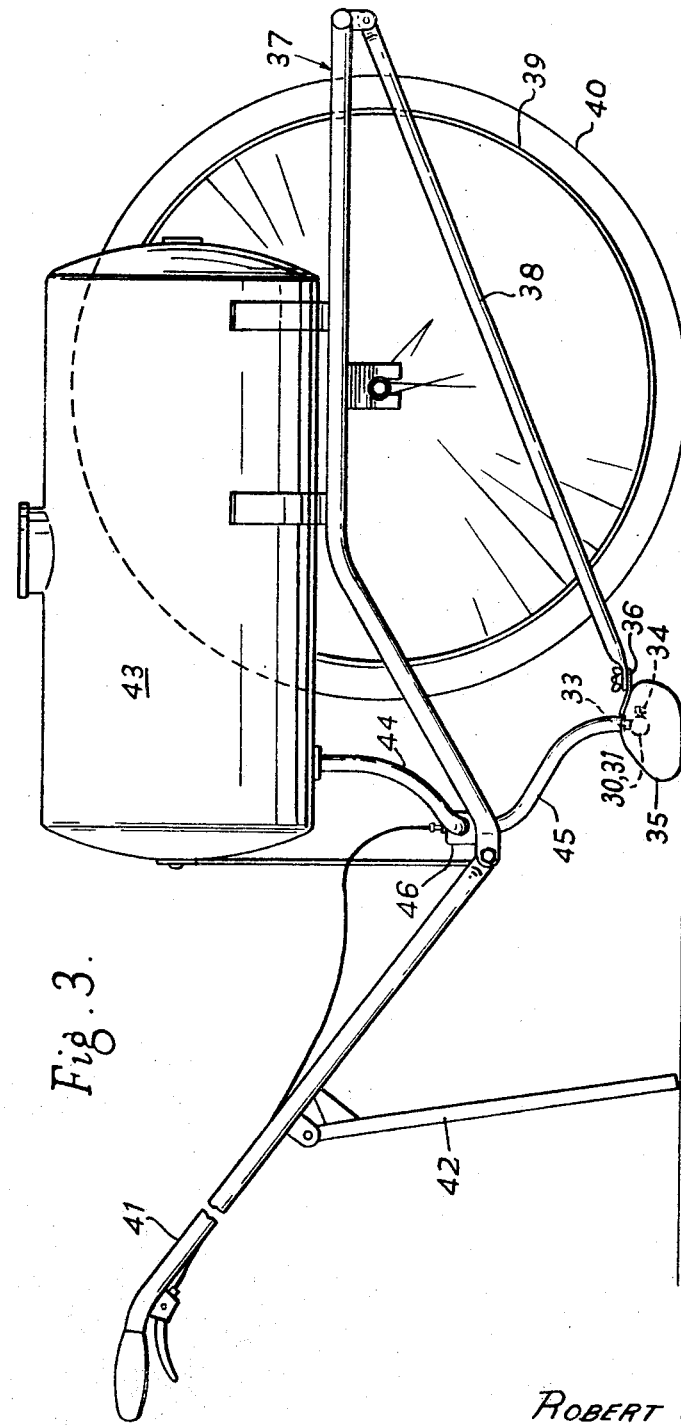

Sept. 6, 1966  R. WATTS  3,270,962
APPLICATOR
Filed Nov. 29, 1962  4 Sheets-Sheet 4

INVENTOR
ROBERT WATTS
BY
Cushman, Darby & Cushman
ATTORNEYS

United States Patent Office 3,270,962
Patented Sept. 6, 1966

3,270,962
APPLICATOR
Robert Watts, Fernhurst, England, assignor to Imperial Chemical Industries Limited, Millbank, London, a corporation of Great Britain
Filed Nov. 29, 1962, Ser. No. 241,007
Claims priority, application Great Britain, Dec. 8, 1961, 44,005/61
1 Claim. (Cl. 239—165)

This invention relates to applicators for liquid weedkillers and to a method of applying liquid weedkillers to the ground.

The invention provides an applicator for the application of liquid weedkiller to the ground especially ground between adjacent rows of growing plants, comprising a distributor having inlet and discharge orifices for the weedkiller and a runner on which the distributor is mounted for travel over the ground, whereby when the distributor is drawn over the ground on its runner the discharge orifices are carried clear of the ground. The distributor can be, for example, a perforated tube or pipe closed at each end and having a conduit—preferably in its middle portion—for the supply of weedkiller, and a row of discharge orifices for discharge of the weedkiller on to the ground, conveniently in a straight row along the length of the tube. To avoid the possibility of the orifices becoming clogged with earth as the tube is drawn over the ground they should preferably be so arranged with respect to the position of the tube in use that they do not lie directly under it. Thus it has been found convenient to have the discharge orifices so aligned in the distributor tube that weedkiller discharged from the orifices is discharged in a rearward direction with respect to the direction of travel of the applicator when in use.

Where a tube distributor is used it can be a single tube, or alternatively, two tubes in telescopic arrangement one within the other. This latter arrangement allows the effective width of the distributor to be adjusted as desired while permitting weedkiller to discharge along the whole effective length by way of the orifices in both tubes.

The applicator preferably has means to maintain the distributor close to the ground surface to avoid the distributor bouncing along the ground when in use and the weedkiller consequently splashing the row plants. The said means can simply consist in the distributor or the runner being sufficiently heavy, or it can be in the form of a separate member, for instance, a spring, urging the runner against the ground. The distributor should, of course, be such that it will withstand the wear and tear imposed upon it by being continuously drawn over the ground. This can be achieved by using a distributor which is itself sufficiently robust, or by using a separate shield member to protect the leading edge of the distributor from damage. Such a shield moreover can, for instance by its weight, also constitute the means for maintaining the distributor close to the ground surface.

Wear of the distributor tube in use can be further reduced by arranging it with respect to the shield so that it is the shield only which is in contact with the ground, that is, the shield also constitutes the runner for the distributor. Adoption of this feature permits the use of a relatively soft, easily worked metal such as copper for the distributor; and this is an advantage in manufacture because the orifices in the distributor can then be readily formed by drilling, whereas if a harder metal such as steel is used such drilling would be much less easy.

The applicators of this invention can be drawn by any suitable land vehicle; for example, for use on a small scale they can be drawn by a hand trolley. For use on a larger scale, the applicator can be drawn by a tractor, and in this instance it is sometimes convenient to use two or more applicators so that ground between three or more rows of plants can be treated with weedkiller at the same time.

The weedkiller can be supplied to the distributor from a supply tank on the vehicle, feeding the distributor by a simple gravity flow feed. In order to ensure an even flow of weedkiller from the distributor it is desirable to arrange that the weedkiller is supplied under the pressure of a constant head of liquid. For example, the supply tank can be used in conjunction with an intermediate control tank having a ball-valve which maintains the level of liquid in that tank at a particular level.

A further applicator of particular interest is one comprising a distributor having inlet and discharge orifices for the weedkiller and a runner on which the distributor is mounted for travel over the ground, the distributor being pivotally attached to a trolley so that when the trolley is pushed forward over the ground the distributor is trailed on its runner behind the trolley wheel or wheels and conforming to the ground contours.

The invention also consists in a method of applying a liquid weedkiller to the ground between adjacent rows of growing plants, in which the weedkiller is supplied to a distributor having discharge orifices for the weedkiller, which is drawn along the ground between the rows so that the orifices are close to but not touching the ground.

The applicator and method of this invention is particularly suitable for the application of bipyridiylium quaternary salt herbicides such as those known by the common names diquat dibromide, diquat dichloride, paraquat di(methylsulphate) and paraquat di(methylchloride) which are de-activated when they come into contact with soil.

Figure 4:
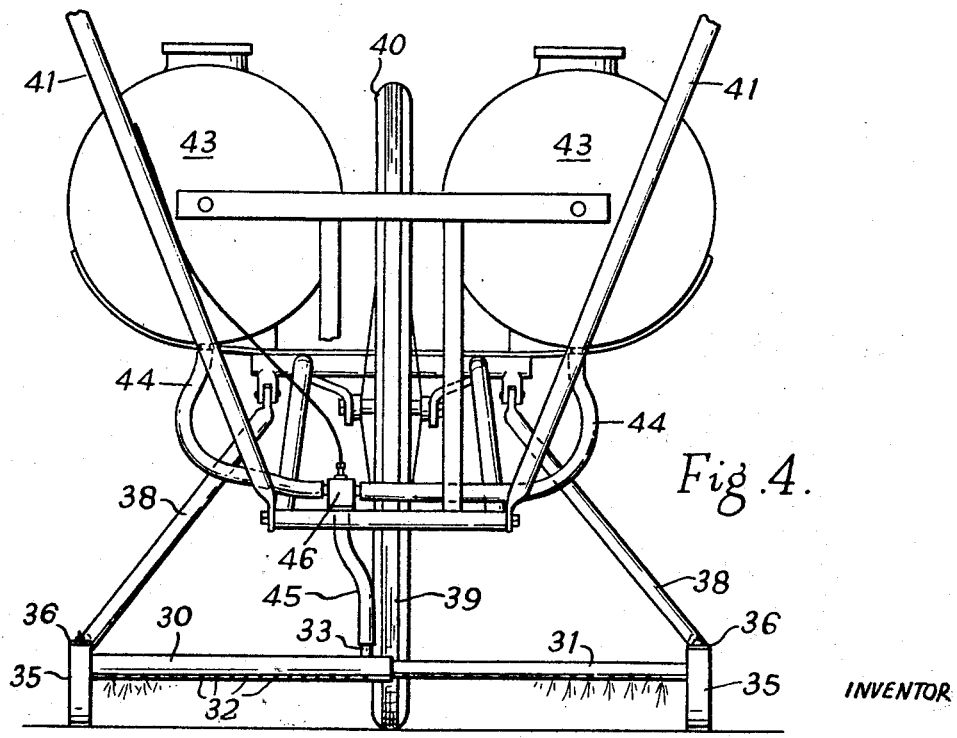

The invention is illustrated with reference to the accompanying drawings by the following description of the construction and operation of two applicators drawn by hand trolleys, which constitute preferred embodiments of the invention. In the drawings FIGURE 1 is a perspective view of the first embodiment, and FIGURE 2 is a cross-sectional view along the line 2—2; FIGURES 3 and 4 are respectively side and rear elevations of the second embodiment and FIGURE 5 is a detail showing the distributor of the second embodiment.

Referring now to the first embodiment, shown in FIGURES 1 and 2, the applicator has a distributor 10 consisting of a straight copper tube 12 inches long and ½ inch internal diameter sealed at each end and having along its length a row of discharge orifices 11 spaced ½ inch apart, each orifice having a diameter of $\frac{1}{32}$ inch. The distributor is carried on a solid steel shield runner bar 12 of the same length as the distributor and of ¾-inch diameter with which the distributor is in side-by-side contact, the tube and runner being soldered together along their line of contact. The portion of the distributor in contact with the runner is on the opposite side from the distributor's row of discharge orifices.

The runner is supported rigidly from its middle portion by a support arm 13 with which it froms a T-piece, the end of the support arm distant from the runner being freely pivoted from a forward extending bracket 14 on the axle of a hand trolley 15. The support arm has two portions 13a and 13b arranged end-to-end and joined together by a pivoted joint 16 with limit stops, which enables the lower part of the support arm to twist with respect to the upper part thereby permitting the distributor and runner to conform to sloping ground surfaces.

The hand trolley 15 consists of a pair of 26 inch bicycle wheels 17 mounted on a common axle 18 on which they can be adjusted so as to be any distance apart between 24 and 36 inches. The axle also carried a pair of bifurcated handles 19 by which the trolley can be pushed and steered. The axle carries immediately above it a supply tank 20 for the weedkiller and its middle portion carries the forward extending bracket 14 having a sleeve parallel to the axle, on which is pivotally mounted the support arm 13. The support arm is free to pivot about the axle extension so that when the trolley is in its normal operating position the runner can trail on the ground with its associated distributor immediately behind it between the wheels and in the line joining their points of contact with the ground.

Means to supply the distributor with liquid weedkiller is provided by a length of rubber tubing 21 attached at one end to the lower portion of the supply tank mounted on the trolley and at the other end to a supply conduit in the centre of the distributor. The rubber tubing passes through a pinch point valve 22 operated by means of a Bowden cable 23 extending to a control on the trolley handle, by means of which supply of weedkiller to the distributor can be regulated as desired. The supply tank has a "constant head" device (not shown) which ensures that the weedkiller is fed to the distributor at a constant rate. This constant head device comprises a vent pipe which extends from the top of the otherwise air-tight tank almost to the bottom of the tank, and ensures that liquid flowing from the tank does so under a "constant head" pressure which corresponds to the distance between the distributor and the lower end of the vent pipe.

There follows a description of the use of the applicator for the application of liquid weedkiller to the ground between the rows of young sugar-beet plants.

First, the supply tank 20 is filled with the liquid weedkiller with the pinch-point valve 22 in the closed position. The hand trolley 15 carrying the applicator is then wheeled towards the ends of the rows of sugar beet plants with the runner 12 being drawn along the ground in its trailing position carrying the distributor behind it. The pinch-point valve is opened, whereupon weedkiller flows through the rubber tubing 21 from the tank to the supply conduit of the distributor, through the tube and discharges by way of the discharge orifices on to the ground between the rows. As the runner is drawn along the ground the distributor is carried with it close to the ground and with its discharge orifices about ¼ inch above the ground. The ends of the runner and distributor pass under the lowermost leaves of the sugar beet plants and the jets of weedkiller fall to the ground about 1 inch behind the distributor thereby wetting weeds growing between the rows but without touching the foliage of the row plants.

An applicator comprising the second embodiment is now described with reference to FIGURES 3, 4 and 5. The applicator has a distributor comprising two tubes 30 and 31 in telescopic arrangement one within the other each having along its length a row of discharge orifices 32 of diameter $\frac{1}{32}$ inch spaced ½″ apart along the tubes. The outer tube 30, which has a bore of ¾″, has an inlet 33 for liquid weedkiller to feed both the inner and outer tubes. The inner tube 31 which is slidably mounted within the outer tube, has a bore of ½″. The inner and outer tubes are closed at their extremities by the steel runners 35 each of which carries a bracket 36, the tubes being so mounted on these runners that with runners on the ground, the row of orifices is about 1½ inches above the ground with the axes of the orifices parallel to it.

The distributor is attached to a frame 37 of a hand trolley by means of two support arms 38 respectively attached at one end to the runner brackets 36 and pivotally attached at their other ends to the forward end of the frame. Means for locking the inner and outer tubes together is provided by bolts and wing nuts at the runner brackets and at the upper ends of the support arms. The frame is carried on the axle of a 20″ diameter wheel 39 (fitted with a pneumatic tyre 40), on which it can be propelled over the ground by means of the handles 41 attached to the rear end of the frame. The handles carry a retractable leg 42 which in its extended position acts as a prop for the frame. Carried on the frame are twin supply tanks 43 for the liquid weedkiller having twin feed tubes 44 leading to a common supply pipe 45 which at its lower end feeds the inlet orifice of the distributor. The flow of weedkiller from the tanks to the distributor is controlled by means of a valve 46, and a substantially constant head of weedkiller is ensured by the fact that the supply tanks are shallow and therefore the depth of liquid in them cannot vary by more than a few inches.

The operation of the applicator comprising this second embodiment is essentially the same as the operation of the first embodiment described above.

What we claim is:

A device for applying liquid weedkiller to the ground between adjacent rows of growing plants while preventing undesirable application of liquid weedkiller to said plants comprising: a vehicle and a distributor assembly; means pivotally securing said distributor assembly to said vehicle for free vertical movement thereof in response to ground irregularities, said distributor assembly comprising at least one longitudinally slidably telescopically adjustable distributor tube extending generally transversely with respect to said rows and being shorter than the distance between said rows, means defining an inlet orifice on said tube; a supply tank on said vehicle for receiving liquid weedkiller; means communicating said supply tank with said inlet orifice; means defining a plurality of generally downwardly directed discharge orifices spaced from one another along said tube; and means on said tube arranged to engage the ground at each end of said tube to support said tube a short distance thereabove to thereby prevent clogging of the discharge orifices by dirt and undesirable application of liquid weedkiller to the plants.

References Cited by the Examiner

UNITED STATES PATENTS

| 559,042 | 4/1896 | Potter | 47—1.7 |
| 821,152 | 5/1906 | Blunt | 239—159 |
| 1,204,772 | 11/1916 | Ludlow | 239—159 X |
| 2,357,141 | 8/1944 | Singleton | 47—1.7 |

FOREIGN PATENTS

| 459,155 | 8/1913 | France. |
| 287,992 | 4/1928 | Great Britain. |

ABRAHAM G. STONE, *Primary Examiner.*

J. R. OAKS, *Assistant Examiner.*